Aug. 18, 1936.    A. E. BRICKMAN ET AL    2,051,465
END CONNECTION FOR FLAT METAL STRIP GUARDRAILS
Filed Nov. 20, 1934
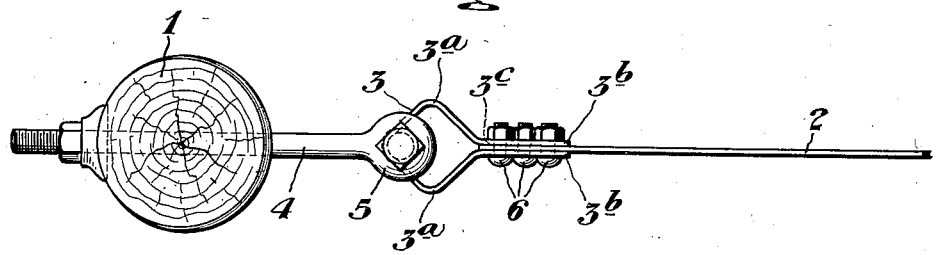
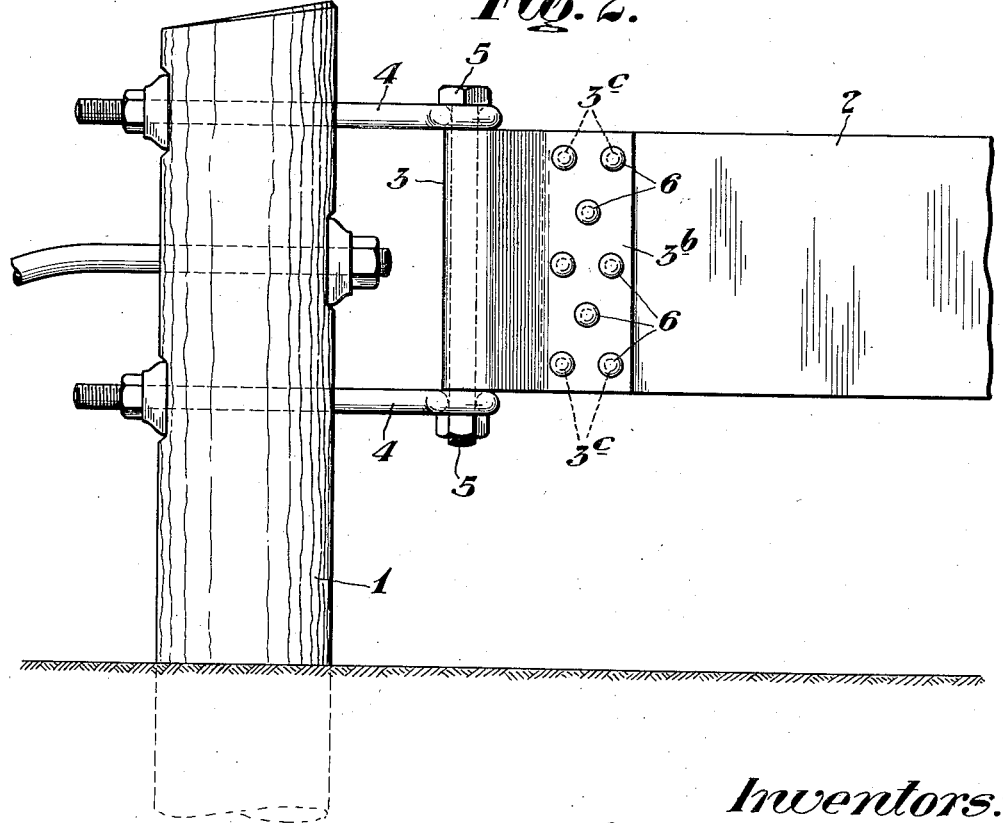
Inventors:
ALAN E. BRICKMAN and
GEORGE A. GLEASON.
by: their Attorneys.

Patented Aug. 18, 1936

2,051,465

UNITED STATES PATENT OFFICE 2,051,465

END CONNECTION FOR FLAT METAL STRIP GUARD RAILS

Alan E. Brickman and George A. Gleason, Worcester, Mass., assignors to The American Steel and Wire Company of New Jersey, a corporation of New Jersey Application November 20, 1934, Serial No. 753,976

3 Claims. (Cl. 256—13.1)

This invention is an improved end connection for flat metal strip guard rails and is for the purpose of both anchoring and tensioning such a guard rail in an inexpensive but safe manner.

In the accompanying drawing, Figure 1 shows a top plan of the invention, while Figure 2 shows the side of the same.

More specifically, this drawing shows the combination of a post 1, a flat metal strip guard rail 2 terminating at this post, an end connection 3 consisting of a flat spring metal strip of the same width as the guard rail and which is rectangularly looped, as at 3$^a$, to bring its end portions 3$^b$ together and which has these portions bent into parallel relationship and provided with bolt or rivet holes 3$^c$, eyebolts 4 extending horizontally from the post 1 in spaced parallel relationship and a pin 5 passed vertically through these eyebolts.

The end portions 3$^b$ of the end connection 3 are arranged on either side of the end portion of the guard rail 1 and are there fastened by bolts or rivets 6. The pin 5 is passed through the end connection, the latter being so rectangularly looped that this pin engages a corner that is alined with the guard rail.

It is to be understood that the guard rail continues on to other posts which horizontally position it in a vertical plane. The resulting road guard is commonly used to guard automobile highways.

Tensioning of the guard rail is effected by the elasticity of the end construction resulting from its looped form. The rectangular shape of the loop imparts greater resiliency and also centers the guard rail respecting the pin 5. When a vehicle collides with the guard rail the end connection simply straightens out, it then forming a solid restraint and being practically as strong as the guard rail itself.

We claim:

1. An end connection for flat metal strip guardrails consisting of a length of flat spring metal strip of the same width as the guard-rail for which it is intended and which is rectangularly looped to bring its end portion together and which has said portions bent into parallel relationship and provided with bolt or rivet holes so that they may be fastened to either side of the end portion of said guard-rail.

2. The combination of a flat metal strip guard-rail terminating at said post, an end connection consisting of a length of a flat spring metal strip of the same width as said guard-rail and which is rectangularly looped to bring its end portions together and which has said portions bent into parallel relationship and provided with registering bolt or rivet holes, eye-bolts extending horizontally from said post in spaced parallel relationship and a pin passed vertically through said eye-bolts, said end portions of said end connection being arranged on either side of the end portion of said guard-rail and being there fastened by bolts or rivets, and said pin being passed through said end connection, the latter being so rectangularly looped that said pin engages a corner that is alined with said guard-rail.

3. In a highway guard the combination of a pin, a loop of spring metal having a greater diameter than said pin and arranged around the same, a guard rail fixed to said loop and extending transversely away from said pin, and means for positioning said pin to prevent its displacement upon tensioning of said guard rail.

ALAN E. BRICKMAN.
GEORGE A. GLEASON.